(12) United States Patent
Beigel

(10) Patent No.: US 6,181,287 B1
(45) Date of Patent: Jan. 30, 2001

(54) REACTIVELY COUPLED ELEMENTS IN CIRCUITS ON FLEXIBLE SUBSTRATES

(75) Inventor: Michael L. Beigel, Corona, CA (US)

(73) Assignee: Precision Dynamics Corporation, San Fernando, CA (US)

( * ) Notice: Under 35 U.S.C. 154(b), the term of this patent shall be extended for 0 days.

(21) Appl. No.: 09/034,176

(22) Filed: Mar. 3, 1998

Related U.S. Application Data

(60) Provisional application No. 60/040,143, filed on Mar. 10, 1997.

(51) Int. Cl.[7] .................................................. H01Q 11/12
(52) U.S. Cl. ............................ 343/741; 343/793; 342/572
(58) Field of Search ..................... 343/742, 795, 343/726, 873, 793, 744; 340/505, 572, 825.54; 342/44, 57

(56) References Cited

U.S. PATENT DOCUMENTS

| | | |
|---|---|---|
| 4,835,524 | 5/1989 | Lamond et al. . |
| 5,142,270 | 8/1992 | Appalucci et al. . |
| 5,223,849 | 6/1993 | Kasevich et al. . |
| 5,483,827 * | 1/1996 | Kulka et al. .......................... 73/146.5 |
| 5,521,601 * | 5/1996 | Kandlur et al. ......................... 342/44 |
| 5,607,417 | 3/1997 | de Vall . |
| 5,708,419 * | 1/1998 | Isaacson et al. ...................... 340/572 |
| 5,914,862 * | 6/1999 | Ferguson ............................... 343/895 |

* cited by examiner

*Primary Examiner*—Tan Ho
(74) *Attorney, Agent, or Firm*—Thomas P. Mahoney

(57) ABSTRACT

An RFID circuit for incorporation in an identification device which includes a polymeric substrate, the circuit being formed or integrally connected with said substrate whereby said substrate becomes a component of the RFID circuit. Ax embodiment of the circuit includes circuit components printed or attached to opposite sides of said substrate utilizing the resistance of said substrate in a reactive or inductive circuit.

14 Claims, 3 Drawing Sheets

REACTIVELY COUPLED ELEMENTS IN CIRCUITS ON FLEXIBLE SUBSTRATES

This application claims the benefit of U.S. Provisional Application No. 60/040,143, filed Mar. 10, 1997.

This invention relates to RF circuits and, more particularly, to reactively coupled elements of said circuits, particularly those disposed on flexible substrates.

BACKGROUND OF THE INVENTION

It is well known to those skilled in the art that the goal in the design and manufacture of RFID tags is to provide low-cost miniature components which, when assembled, will be susceptible of incorporation in a wide variety of applications where miniaturization and low cost are requisite.

Typical of prior art attempts at miniaturization and low cost are the arrangement of the components of the circuit in a uniform plane with the conductors incorporated in the circuit disposed in said plane.

However, the conductive securement of the IC circuit to the antenna continues to pose problems in that it increases the thickness of the assemblage and prevents the utilization of such combinations in many applications such as miniaturized PFID tags.

Consequently, in ultra-miniature circuits, for example RFID tags, miniaturizing circuit dimensions and decreasing production costs are ongoing objectives. Recent patents teach methods of implementing this miniaturization with respect to attachment of the integrated circuits to the antenna by the simplest, lowest profile and most economical means conceived of at the time (e.g., Marsh U.S. Pat. No. 5,566,441 and Moskovitz U.S. Pat. No. 5,528,222).

OBJECTS AND ADVANTAGES OF THE INVENTION

An object of my invention is the provision of a circuit for eliminating conductors between the IC components of an RFID and the associated antenna materially reducing the overall cost and increasing the utility of the IC/antenna combination.

Another object of my invention is the provision of an RFID circuit wherein the electrical conductors between electronic circuit elements are supplanted by electromagnetically reactive capacitive coupling means, utilizing electrically conductive areas such as inks, films, or foils on thin insulating dielectric substrates.

Another object of my invention is the provision of circuits of the aforementioned character wherein inductive coupling means are utilized in substitution for said capacitive coupling means.

An additional object of my invention is the provision of circuitry of the aforementioned character wherein the conductive and capacitive coupling means are supplanted by the utilization of lumped coupling means.

A further object of my invention is the incorporation of an RFID circuit of the aforementioned character in an identification device utilizing flexible substrates, such as, for example, sheet polymer materials utilized in identification wristbands wherein the components of the RFID can be placed on superimposed strips of polymer sheets and electronic communication between the components of the RFID is established by capacitive coupling means.

An additional object of my invention is a provision of an assemblage of the aforementioned character wherein the capacitive coupling means is supplanted by inductive coupling means.

A further object of my invention is the provision of an RFID assemblage mounted in a flexible identification wristband formed from flexible polymers wherein superimposed laminae of said flexible polymers include an RFID circuit incorporating lumped electronic conductor means.

Other objects and advantages of my invention will be apparent from the following specification and the accompanying drawings which are for the purpose of illustration only.

DESCRIPTION OF PREFERRED EMBODIMENTS OF THE INVENTION

Figure 1:
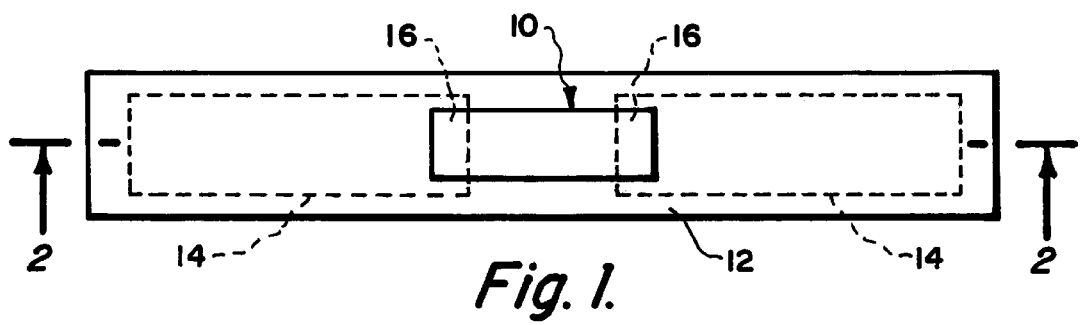
FIG. 1: shows a reactively coupled RFID tag in capacitive coupling with a dipole antenna.
Figure 2:
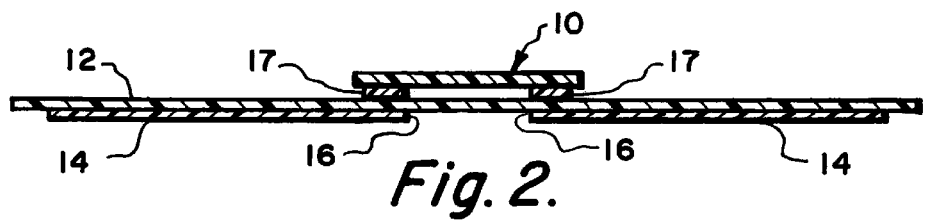
FIG. 2: is a longitudinal sectional view taken on the line 2—2 of FIG. 1.

Referring to the drawings, and particularly to FIGS. 1 and 2 thereof, I show an integrated circuit chip 10 mounted on one surface of an elongated flexible substrate 12 such as a polymer strip and having a reactively coupled capacitive connection to a dipole antenna 14 on the other side of said strip.

There are various ways of attaching an integrated circuit to a substrate consisting of a polymeric film and, in the case of chip 10, the operative connection thereof to the substrate may be accomplished by adhesive means.

The antenna 14 may be imprinted on the opposite sides of the substrate by the utilization of conductive inks or may be provided in the form of conductive foils adhesively or otherwise secured in underlying relationship with the IC chip 10.

The capacitive coupling of the chip 10 to the antenna 14 is accomplished by terminal areas 17 on the chip 10 which overlie corresponding extremities 16 of the antenna 14. The terminal areas 17 of the chip 10 are electrically connected to the circuitry of the chip 10.

In addition to providing operative coupling, the capacitance (reactance) between the IC and the substrate can be utilized as a capacitative component in a resonant RFID antenna circuit or other resonant circuit.

Further, in the case of coupling of electronic circuit elements on opposite sides of a thin insulating dielectric film at appropriate frequencies, capacitive, inductive, or lumped reactive interconnection or coupling of the elements may be obtained by placing appropriate conducting areas or patterns on opposite sides of the film at the point of coupling. This can be accomplished by the adhesive attachment of conductive foils or printing of conductive inks on the opposite sides of the film.

By the capacitive coupling of circuit elements, the need for electrical connections constituted by conductors through windows or vias in the substrate is eliminated. Consequently, the production of functional circuits by printing or similar processes in a continuous production line is simplified and enhanced. Moreover, the overall thickness and consequent size of the package is greatly reduced.

Figure 3:
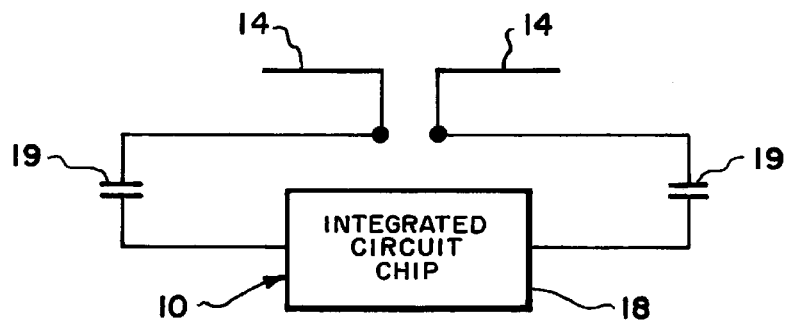
FIG. 3: shows the coupling circuit means of FIGS. 1 and 2.

The circuit 18 of FIG. 3 shows the chip 10 connected to the dipole antenna 14 by the capacitive coupling 19. The capacitance of the overlying terminal areas 17 of the chip 10 and the extremities 16 of the dipole antenna 14 can be calculated by the formula for a parallel plate capacitor:

$$C(\text{in farads}) = er * eo * A/d$$

where er is the relative dielectric constant eo is the permittivity of free space, $8.85*10^{-12}$ farads/meter A is the plate area in $m^2$ and d is the separation between the plates, A is the area of the overlap, d is the distance between the plates, er is the dielectric constant of the substrate 12, and eo is the permittivity of free space, $8.85*10^{-12}$ farads/meter constant. Thus, for an overlap area of 4 sq. millimeters, a distance of 0.1 mm, and a dielectric constant 3.0, the capacitance of the coupling circuit is 1.062 picofarads.

At a frequency of 2.4 GHz, the impedance of the capacitive reactance is equal to 62 ohms, which will resonate a circi whose reactance is inductive on the order of 62 ohms. Assuming dimensions of the dipole antenna formed by the conductive antenna portions 14 are 2.6" of the total length by ⅛", then an antenna is formed which is resonant at 2.4 GHz. The circuit 18 is shown in FIG. 3 of the drawings wherein the capacitance 19 between the terminal areas 17 of the IC and the extremities of the antenna 14 is illustrated.

Figure 4:
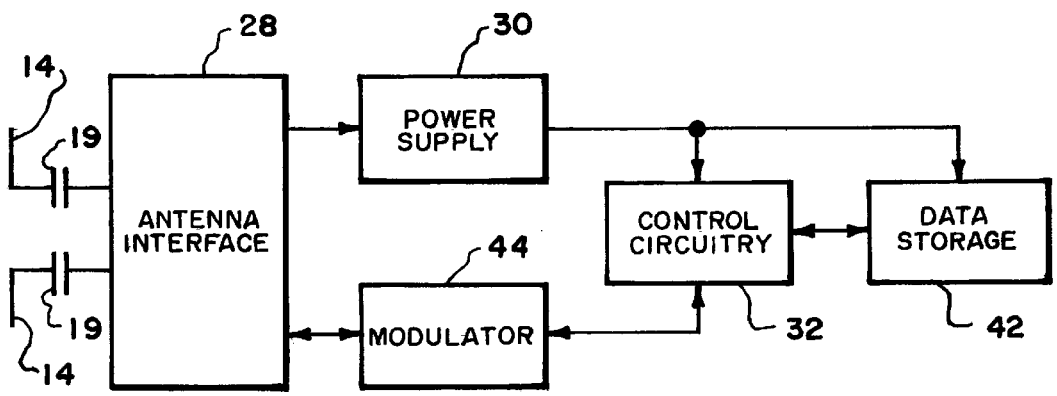
FIG. 4: is a block diagram of the components of FIGS. 1–3.

The block diagram of FIG. 4 shows a passive RFID tag incorporating the circuit elements of FIGS. 1–3. A Reader-Programmer radiates an electromagnetic field to supply the tag with power and to communicate with the tag. The dipole antenna elements 14 are connected by the capacitive/inductive circuit 19 to an antenna interface 28 and the antenna interface is connected on one side to a power supply 30 which supplies power to control circuitry 32 and data storage 42, said data storage and computer circuitry being mutually interconnected to a modulator 44 which is, in turn, connected to the antenna interface 28.

The poster supply circuit 30 derives power by rectifying the voltage induced in the antenna 14. The RFID tag receives information by variations in the reader field and transmits signals to the reader by impressing a modulation signal on the antenna interface. Control circuits provide logic, timing, and control signals to the components of the tag IC appropriate for the complexity of the tag function and its communication protocol. Data storage circuitry 42 in the tag provides information storage ranging from A READ-ONLY ID number to a READ-WRITE database.

Figure 5:
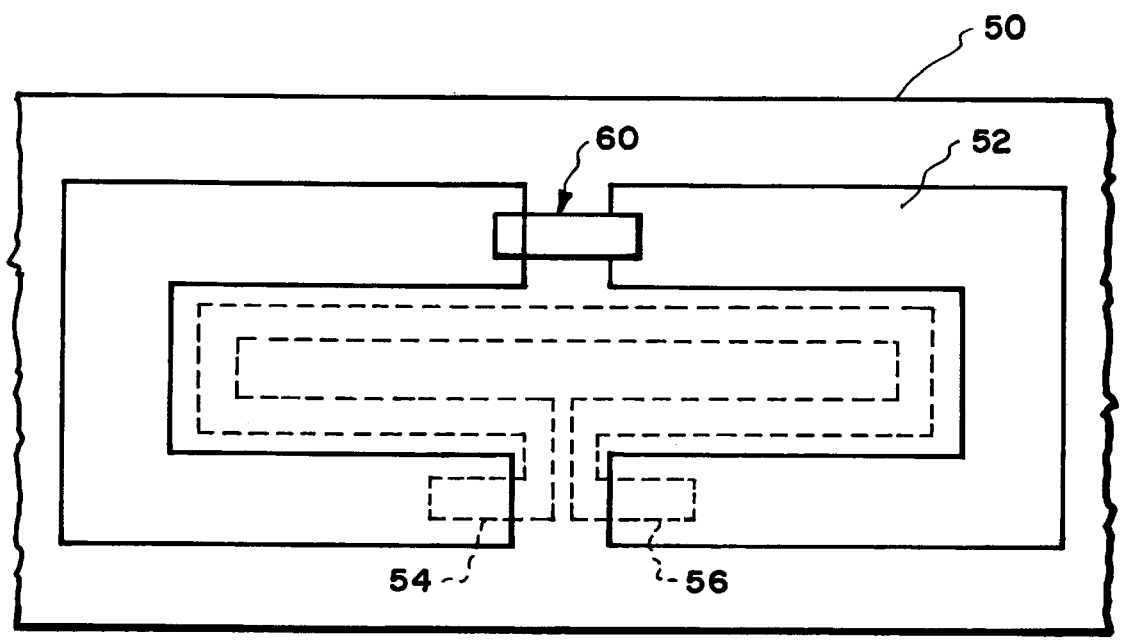
FIG. 5: is an RFID tag with capacitively coupled antenna elements on opposite sides of the flexible substrate.
Figure 6:
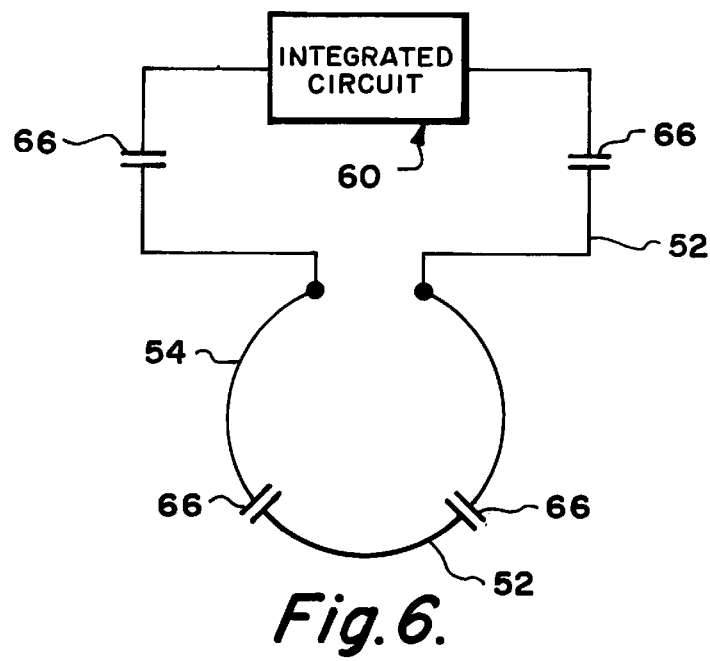
FIG. 6: is the circuit of FIG. 5.

An alternative antenna arrangement is shown in FIGS. 5 and 6 of the drawings as including overlapping antennas 52 and 54 on opposite surfaces of the substrate 50, the antenna 52 bring of substantially truncated rectangular construction and the antenna 54 being of substantially loop construction and located internally of the antenna 52. Overlapping areas 56 of the antenna introduce series capacitances in the antenna elements.

At a frequency range of 900 MHz, capacitive coupling of the IC to the antenna is practical, but the effective length of the antenna must be longer than for operation at 2.2 GHz. In this case, the coupling is used to provide antenna elements on both sides of the substrate with the antenna 52 located on one side of the substrate and the antenna 54 located on the other side of the substrate with the overlapping areas located in spaced relationship with each other through the medium of the polymer of the substrate.

The IC chip 60 is located in overlapping relationship with the bi-polar extremities of the antenna 52 and establishes a capacitive coupling in the manner previously described. In turn, the opposite extremities of the antenna 52 are disposed in overlapping capacitive relationship with the extremities of the antenna 54 on the other side of this substrate. In this manner, the length of the antenna is extended and much more capacitive reactance is provided. It should be kept in mind that series inductance between antenna elements increases the electrical length of the antenna and series capacitance decreases it. The antenna can be electrically longer by adding more elements and using capacitance to provide the connection. However, the capacitance must be of low impedance so as not to defeat the added elements.

Illustrated in FIG. 6 is the circuitry of the dual antenna combination wherein the dual capacitance is illustrated at 66 in relationship to the integrated circuit 60. The loop antenna 54 is capacitively connected to the antenna 52 by the capacitances 66.

Figure 7:
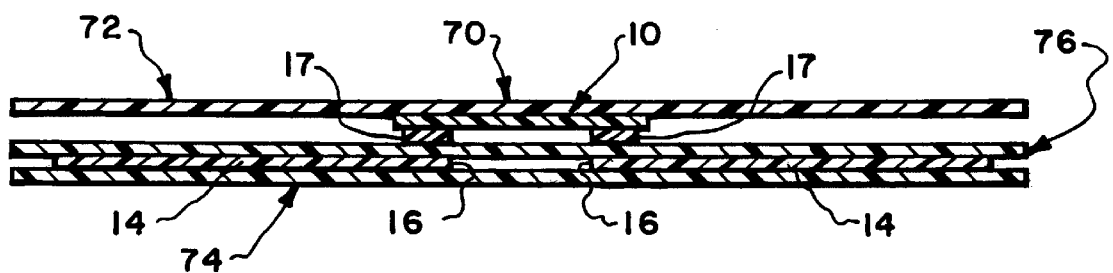
FIG. 7: shows a tri-laminar embodiment.

Shown in FIG. 7 is a tri-laminar device 70 which incorporates an upper lamina 72 and a lower lamina 74 encompassing an intermediate lamina 76 which has the chip 10 secured to one surface thereof and the antenna 14 secured to the opposite surface thereof.

By the utilization of the dual antennae, the resultant is the equivalent of an antenna which is long enough to be resonant with the designed circuitry.

Although I have disclosed specific reactive circuitry utilized in conjunction with a polymer substrate, it will be obvious to those skilled in the art that alternative circuitry may be utilized without departing from the scope and spirit of the invention as defined in the claims.

I claim:

1. In a radio frequency identification circuit, the combination of:

a flexible, load-bearing and load-transmitting structural substrate;

electrically isolated components of said circuit formed on opposite surfaces of said substrate in overlying relationship with each other whereby said substrate creates a capacitive relationship between said components; and an antenna connected to said circuit by said components.

2. The device of claim 1 in which the circuit components are imprinted in conductive ink.

3. The device of claim 1 in which the circuit components are fabricated from metallic foils.

4. The device of claim 1 in which the circuit components are polymer conductors.

5. In a radio frequency circuit, the combination of:

a flexible, load-bearing and load-transmitting structural substrate;

electrically isolated components of said circuit formed on opposite surfaces of said substrate in overlying relationship with each other whereby said substrate creates an inductive relationship between said components; and an antenna connected to said circuit by said components.

6. In a radio frequency circuit, the combination of:

substrate means including a plurality of polymeric laminae secured in overlying relationship with one another, said laminae including a top lamina, a bottom lamina, and an intermediate lamina disposed between said top and bottom laminae, said radio frequency circuit being formed on one or more of said laminae;

electrically isolated circuit components formed on the top and bottom surfaces of said intermediate lamina to utilize said intermediate lamina as a circuit component; and an antenna on one of said laminae connected to said radio frequency circuit by said components.

7. The device of claim 6 wherein the circuit components provide a reactive circuit.

8. The circuit of claim 6 wherein the circuit components provide an inductive circuit.

9. The radio frequency circuit of claim 6 which includes a plurality of antennae formed on opposite sides of said intermediate lamina in overlying relationship with each other.

10. The radio frequency circuit of claim 9 in which said antennae are operatively connected to said radio frequency circuit by a capacitive circuit of said components.

11. The circuit of claim 9 in which said antennae are operatively connected to said radio frequency circuit by an inductive circuit of said components.

12. In a circuit for an RFID, the combination of:

a flexible, load-bearing and load-transmitting structural substrate for said circuit, said substrate acting as a structural component of said RFID; electrically isolated circuit components formed on opposite surfaces of said substrate in overlying relationship with each other to incorporate said substrate as an operative component of said circuit; and an antenna on said substrate connected to said circuit circuit by said components.

13. The circuit components of claim 12 which ate capacitive and wherein said substrate operates as the dielectric component of said circuit components.

14. The circuit components of claim 12 which are inductive and wherein said substrate operates as the dielectric component of said circuit components.

* * * * *

UNITED STATES PATENT AND TRADEMARK OFFICE
CERTIFICATE OF CORRECTION

PATENT NO.    : 6,181,287 B1
DATED         : January 30, 2001
INVENTOR(S)   : Michael L. Beigel It is certified that error appears in the above-identified patent and that said Letters Patent is hereby corrected as shown below:

Abstract,
Line 4, after the period, replace "Ax" with -- An --.

Column 3,
Line 26, replace the first word, "circi", with -- circuit --.
Line 57, after "52", replace "bring" with -- being --.
Line 64, after "operation at", replace "2.2" with -- 2.4 --.

Claims,
Column 6,
Line 5, after "RFID;", the remainder of that paragraph should be a new paragraph beginning with "electrically isolated" and ending with "said circuit; and".
Line 10, after "said", delete the duplication of "circuit".

Signed and Sealed this

Sixth Day of November, 2001

*Attest:*

*Attesting Officer*

NICHOLAS P. GODICI
*Acting Director of the United States Patent and Trademark Office*